(12) United States Patent
Kobayashi et al.

(10) Patent No.: US 8,059,889 B2
(45) Date of Patent: Nov. 15, 2011

(54) POSITION AND ORIENTATION MEASUREMENT APPARATUS AND CONTROL METHOD THEREOF

(75) Inventors: Kazuhiko Kobayashi, Yokohama (JP);
Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 12/123,125

(22) Filed: May 19, 2008

(65) Prior Publication Data

US 2008/0292180 A1    Nov. 27, 2008

(30) Foreign Application Priority Data

May 21, 2007    (JP) .................................. 2007-134583

(51) Int. Cl.
*G06K 9/46*    (2006.01)
(52) U.S. Cl. ........................................ 382/154; 348/135
(58) Field of Classification Search .................. 382/154
See application file for complete search history.

(56) References Cited

U.S. PATENT DOCUMENTS

| | | | | |
|---|---|---|---|---|
| 5,819,016 A | * | 10/1998 | Watanabe et al. | ............. 345/419 |
| 2002/0175994 A1 | * | 11/2002 | Sakakibara et al. | ........... 348/135 |
| 2005/0069196 A1 | * | 3/2005 | Uchiyama et al. | ............. 382/154 |

FOREIGN PATENT DOCUMENTS

JP    2004-326314    11/2004

OTHER PUBLICATIONS

Tom Drummond and Roberto Cipolla, "Real-time visual tracking of complex structures," IEEE Transaction of Pattern Analysis and Machine Intelligence, vol. 24, No. 7, pp. 932-946, 2002.

* cited by examiner

*Primary Examiner* — Samir Ahmed
*Assistant Examiner* — Ruiping Li
(74) *Attorney, Agent, or Firm* — Cowan, Liebowitz & Latman, P.C.

(57) ABSTRACT

A position and orientation measurement apparatus for measuring the position and orientation of an image capturing apparatus, which captures an image of a measurement object, relative to the measurement object, extracts configuration planes of the measurement object based on three-dimensional model data of the measurement object, and extracts measurement line segments to be used in detection of edges of a captured image from line segments which form the configuration planes. The position and orientation measurement apparatus projects the extracted measurement line segments onto the captured image based on an estimated position and orientation of the image capturing apparatus, selects visible measurement line segments which are not hidden by the extracted configuration planes, and calculates the position and orientation of the image capturing apparatus relative to the measurement object based on the visible measurement line segments and corresponding edges of the captured image.

14 Claims, 5 Drawing Sheets

3D MODEL OF MEASUREMENT OBJECT

DATA EXTRACTED FROM 3D MODEL

POSITION AND ORIENTATION MEASUREMENT APPARATUS AND CONTROL METHOD THEREOF

BACKGROUND OF THE INVENTION

1. Field of the Invention

The present invention relates to a position and orientation measurement technique for measuring the position and orientation of an image capturing apparatus based on the distance between a position where a model of a measurement object is projected onto a captured image, and the position of the measurement object observed from the captured image.

2. Description of the Related Art

The position and orientation measurement of an image capturing apparatus (to be also referred to as "camera" hereinafter as needed) such as a camera that captures an image of a physical space and the like is required in, for example, a mixed reality system which blends and displays the physical space and a virtual space.

In general, as a method of measuring the position and orientation of an image capturing apparatus, a method of attaching indices, whose three-dimensional (3D) positions are given, to a measurement object is disclosed. In the position and orientation measurement method of this type, the position and orientation are estimated to minimize the differences between the projected positions obtained by projecting 3D positions of the indices onto an image capturing frame according to the estimated position and orientation, and the image positions of the indices detected from a captured image. In this case, as the indices serving as targets, those which have geometric features or those having specific colors or luminance values are used since it is desired to allow easy detection of such indices by image processing.

However, upon assuming the use over a broad range, the indices used to detect the position and orientation cannot always be attached to a measurement object. For example, when a measurement object is an architectural structure such as a building or the like, it is difficult to attach giant indices onto its wall surface.

As a method of solving this problem, many methods of estimating the position and orientation of a physical camera using the ridge lines of planes that configure an object have been proposed. With these methods, edges of a measurement object are extracted from a captured image, and the position and orientation of an image capturing apparatus are calculated based on correlation between the extracted edges and an edge image obtained by rendering a CAD model by CG.

If a measurement object is designed by CAD, it is easy to create a reference image by CG. However, even in this case, since it is required to exhaustively calculate possible positions and orientations, preparation processes are required.

As one of these methods, Japanese Patent Laid-Open No. 2004-326314 (to be referred to as reference 1 hereinafter) discloses a method using a CAD model. According to reference 1, edges are detected from 3D model projected images observed from a plurality of viewpoints, line segments of the edges are approximated using parameters and held, and correlations between an actually observed captured image and the line segments reconstructed based on the parameters are calculated. The position and orientation of a virtual camera of a 3D model projected image having a highest correlation are acquired as those of the image capturing apparatus.

With this method, reference images observed from a plurality of viewpoints are generated in advance, and image correlations with edges observed on a captured image are calculated. For this reason, huge amounts of time are required with increasing number of reference images. In order to precisely calculate the position and orientation, sufficient reference images need to be prepared. Hence, the method of reference 1 can only be applied to a case in which processing can be done for a long period of time after image capturing.

On the other hand, in mixed reality or object recognition of a robot, the position and orientation estimation processing of an image capturing apparatus is required to be executed at an update interval of captured images. The update interval of captured images in this case is 33 msec in case of an NTSC video signal. For this reason, it is difficult to apply the method that calculates the image correlations between the edges of many reference images and those of a captured image like in reference 1.

As another problem, when a measurement object is configured by a plurality of structural objects, and some of these structural objects are free to move, since the motion of each movable object is unknown, reference images cannot be acquired in advance. As another method of solving this problem, Tom Drummond and Roberto Cipolla, "Real-time visual tracking of complex structures," IEEE Transaction of Pattern Analysis and Machine Intelligence, Vol. 24, No. 7, pp. 932-946, 2002 (to be referred to as reference 2 hereinafter) discloses a method of estimating the position and orientation of an image capturing apparatus online based on the edges in a captured image captured by the image capturing apparatus. Unlike in reference 1, this method does not require pre-acquisition of reference images, and can be applied to the estimation of position and orientation of an image capturing apparatus in real time. Since this method does not require any correlation calculations between the reference images and a captured image, the processing time is short.

In the method disclosed in reference 2, the position and orientation of a camera are estimated based on a technique for projecting a 3D model onto a captured image upon updating the position and orientation, and searching only an image around a search point for edges. Furthermore, as will be described later, this method is designed to shorten the processing time associated with image processing. As for movement of the measurement object, since the position and orientation can be individually estimated, the method is not limited in terms of motions.

An outline of the processing sequence of this method is as follows.

[1] Measurement line segments of a measurement object are projected onto an image capturing frame using a rough estimating position and orientation.

[2] The positions of edge regions where the density changes locally are acquired by searching pixels around the projected measurement line segments.

[3] The position and orientation are optimized to minimize the distances between the positions of the edge regions and the projected measurement line segments.

[4] The values of the estimating position and orientation are updated by the optimized position and orientation.

Since a 3D model of the measurement line segments to be projected uses only line segments that allow easy detection of edges, the position and orientation of an image capturing apparatus can be calculated with higher precision and at higher speed. In practice, since it takes much time to search all pixels around the projected measurement line segments, points obtained by further sampling the projected measurement line segments at appropriate intervals are used as search points.

With this method, a vertical, finite search in a one-dimensional direction is conducted at each search point in the direction of each projected measurement line segment. Assume that the edge to be searched is a region having a local density change in a captured image, and a region in which the density gradient is locally large is detected using an edge detection image filter such as a Laplacian filter or the like.

As the estimated position and orientation are closer to the actual position and orientation, the distances between the found edge positions of the captured image, and the measurement line segments projected onto the image become smaller. However, an actual captured image includes many noise components. Factors that influence the estimation precision include erroneous detection and non-detection of edges. For this reason, the measurement line segments had better be determined considering correspondence with edges observed on the captured image.

In this method, processing for excluding a line segment on a region hidden by another object, a line segment located at a position opposite to a line of sight, and the like from search points of an edge is executed. With this processing, the estimation of position and orientation can be applied to a case in which a plurality of measurement objects overlap in the line of sight direction or to a non-flat, complicated shape.

On the other hand, in a computer graphics technique, a hidden-line removal technique for selectively rendering a line hidden by a plane and a visible line is known. By applying this technique, a line hidden by a plane is removed, a line segment which is not observed on the measurement line segment captured image can be excluded from a search target of an edge. Transformation of a 3D model onto a captured image uses the estimating position and orientation of an image capturing apparatus. The positions of configuration planes and line segments of the 3D model undergo coordinate transformation to those observed from the line of sight direction corresponding to the estimating position and orientation, and a distance in the depth direction at that time is calculated. The distance in the depth direction is held as a range image corresponding to the captured image. The calculated distance in the depth direction is compared with the value of the range image, and when the calculated distance assumes a smaller value, the value of the range image is updated.

In reference 2, a range image is generated from a plurality of planes which configure a measurement object. Next, measurement line segments undergo coordinate transformation to have a rough position and orientation of the image capturing apparatus as a viewpoint. Of edge search point candidates of the measurement line segments, the values in the depth direction are compared with the value of the range image based on the configuration plane. If the value of the edge search point candidate is equal to or smaller than the value of the range image, edge search processing is then executed using that candidate as an edge search point.

Furthermore, in this method, in order to improve processing efficiency, rendering of the configuration planes of the measurement object is sped up using a rendering function of graphics rendering hardware. Information of the configuration planes of the measurement object is important upon determining whether or not line segments to be measured on an image are hidden by another measurement object. A line segment which is not observed on a captured image is selected as a measurement object unless it is checked whether or not that line segment is hidden by another plane, and the position and orientation estimation precision cannot be improved. For example, when measurement line segments located on the back side of a measurement object are used, they are not actually observed on the captured image in some cases. However, since other edges are erroneously detected as corresponding edges, such line segments are handled as points having large errors.

Upon application of the aforementioned method, data of measurement line segments, and data of the configuration planes of a measurement object used to test whether or not that line segment is actually observed need to be prepared. If the measurement object is designed using CAD or the like, the configuration planes and line segments can use that design.

In case of a 3D model configured by combining simple planes, since such 3D model has a configuration of edges to be observed similar to the configuration planes, the configuration plane data can be the same as data of the measurement line segments used in registration. However, in this case, since the measurement object needs to be a 3D model such as a simple rectangular parallelepiped or rectangle, such object has a narrow application range to an actual scene. In general, upon handling a measurement object having a complicated shape, it is difficult to set information of the configuration and that of the measurement line segments to be the same.

Even in a measurement object having a complicated shape, a complicated curved surface or object shape can be described using polygons such as simple triangles or rectangles. However, such polygons have a problem in the use as measurement line segments.

The condition required for line segments to be observed as edges on a captured image includes discontinuity of the boundaries of configuration planes from adjacent configuration planes, and discontinuity of the physical properties of configuration planes with respect to light from adjacent configuration planes. For this reason, a complicated plane is normally configured by polygons of a plurality of triangles or rectangles having an identical normal. Not all line segments of the polygons which configure such complicated plane are observed as edges on an actual captured image. In case of planes which configure a curved surface, even when the planes are continuous, they have different overall reflection angles in terms of an illumination position depending on the observation position, and they may be consequently observed as edges upon observation from far.

In this manner, when the configuration planes are used as measurement line segments, even for line segments located on the front side in the line of sight direction, if one plane is configured by a plurality of polygons, a line segment sandwiched between planes of a 3D model does not normally correspond to an edge observed on the image capturing frame. Therefore, the configuration planes of a 3D model cannot be used as information of measurement line segments for registration intact.

Therefore, the measurement line segments and line segments used to form the configuration planes of a 3D model may be held as independent data. However, such configuration suffers the following problem. For example, it is difficult to maintain consistency between information of the configuration planes of the measurement object, and actual measurement line segments, and a flexible change of the measurement object cannot be coped with. In other words, no means for using a list of a huge number of vertices and line segments that express shapes, and data sets of measurement line segments as a partial set of such list while maintaining consistency has been proposed. For example, in the studies of reference 2 or the like, a measurement object for verification is given, and information of the configuration planes and information of the measurement line segments, which are adjusted in advance, are independently held, thus implementing the position and orientation registration of the given measurement object.

A technique for estimating the position and orientation by reducing differences between line segments obtained by projecting a 3D model of a measurement object onto a captured image, and the corresponding edge positions on the captured image is known. In this technique, in order to handle a complicated measurement object, line segments of a model to be measured are associated with actually observed edges, thus improving the precision. Since there are no procedures using the aforementioned method of estimation of position and orientation while maintaining consistency between data sets of the configuration planes of objects used there and those used in measurement, such position and orientation estimation apparatus has poor convenience.

SUMMARY OF THE INVENTION

The present invention has been made in consideration of the aforementioned problems, and provides a position and orientation measurement apparatus which can maintain consistency of data sets even when a 3D model of a measurement object has been geometrically changed, according to its exemplary embodiment. Also, the present invention provides a position and orientation measurement apparatus which can simplify procedures required to estimate the position and orientation of a measurement object having a complicated shape.

According to one aspect of the present invention, there is provided a position and orientation measurement apparatus for measuring a position and orientation of an image capturing apparatus, which captures an image of a measurement object, relative to the measurement object, the apparatus comprising:

a configuration plane extraction unit configured to extract configuration planes of the measurement object based on held three-dimensional model data of the measurement object;

a line segment extraction unit configured to extract measurement line segments used in detection of edges of a captured image from line segments which form the configuration planes of the three-dimensional model data, based on characteristics of adjacent configuration planes;

a line segment projection unit configured to project the measurement line segments extracted by the line segment extraction unit onto the captured image, based on an estimated position and orientation of the image capturing apparatus;

a selection unit configured to select visible measurement line segments which are visible at the estimated position and orientation from the measurement line segments projected onto the captured image, based on the configuration planes extracted by the configuration plane extraction unit; and a calculation unit configured to calculate a position and orientation of the image capturing apparatus relative to the measurement object based on the measurement line segments selected by the selection unit and corresponding edges of the captured image.

Also, according to another aspect of the present invention, there is provided a position and orientation measurement apparatus for measuring a position and orientation of an image capturing apparatus, which captures an image of a measurement object, relative to the measurement object, the apparatus comprising:

a holding unit configured to hold three-dimensional model data of the measurement object, the three-dimensional model data being assigned for each line segment with an attribute, which indicates whether or not that line segment is used in detection of edges of a captured image;

a configuration plane extraction unit configured to extract configuration planes of the measurement object based on the three-dimensional model data;

a line segment extraction unit configured to extract line segments assigned with the attribute indicating the line segments used in detection of edges of the captured image as measurement line segments from the three-dimensional model data;

a line segment projection unit configured to project the measurement line segments extracted by the line segment extraction unit onto the captured image, based on an estimated position and orientation of the image capturing apparatus;

a selection unit configured to select visible measurement line segments which are visible at the estimated position and orientation from the measurement line segments projected onto the captured image, based on the configuration planes extracted by the configuration plane extraction unit; and a calculation unit configured to calculate a position and orientation of the image capturing apparatus relative to the measurement object based on the measurement line segments selected by the selection unit and corresponding edges of the captured image.

Also, according to another aspect of the present invention, there is provided a method of controlling a position and orientation measurement apparatus for measuring a position and orientation of an image capturing apparatus, which captures an image of a measurement object, relative to the measurement object, the method comprising:

a configuration plane extraction step of extracting configuration planes of the measurement object based on held three-dimensional model data of the measurement object;

a line segment extraction step of extracting measurement line segments used in detection of edges of a captured image from line segments which form the configuration planes of the three-dimensional model data, based on characteristics of adjacent configuration planes;

a line segment projection step of projecting the measurement line segments extracted in the line segment extraction step onto the captured image, based on an estimated position and orientation of the image capturing apparatus;

a selection step of selecting visible measurement line segments which are visible at the estimated position and orientation from the measurement line segments projected onto the captured image, based on the configuration planes extracted in the configuration plane extraction step; and a calculation step of calculating a position and orientation of the image capturing apparatus relative to the measurement object based on the measurement line segments selected in the selection step and corresponding edges of the captured image.

Furthermore, according to another aspect of the present invention, there is provided a method of controlling a position and orientation measurement apparatus for measuring a position and orientation of an image capturing apparatus, which captures an image of a measurement object, relative to the measurement object, the method comprising:

a holding step of holding three-dimensional model data of the measurement object, the three-dimensional model data being assigned for each line segment with an attribute, which indicates whether or not that line segment is used in detection of edges of a captured image;

a configuration plane extraction step of extracting configuration planes of the measurement object based on the three-dimensional model data;

a line segment extraction step of extracting line segments assigned with the attribute indicating the line segments used in detection of edges of the captured image as measurement line segments from the three-dimensional model data;

a line segment projection step of projecting the measurement line segments extracted in the line segment extraction step onto the captured image, based on an estimated position and orientation of the image capturing apparatus;

a selection step of selecting visible measurement line segments which are visible at the estimated position and orientation from the measurement line segments projected onto the captured image, based on the configuration planes extracted in the configuration plane extraction step; and a calculation step of calculating a position and orientation of the image capturing apparatus relative to the measurement object, based on the measurement line segments selected in the selection step and corresponding edges of the captured image.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
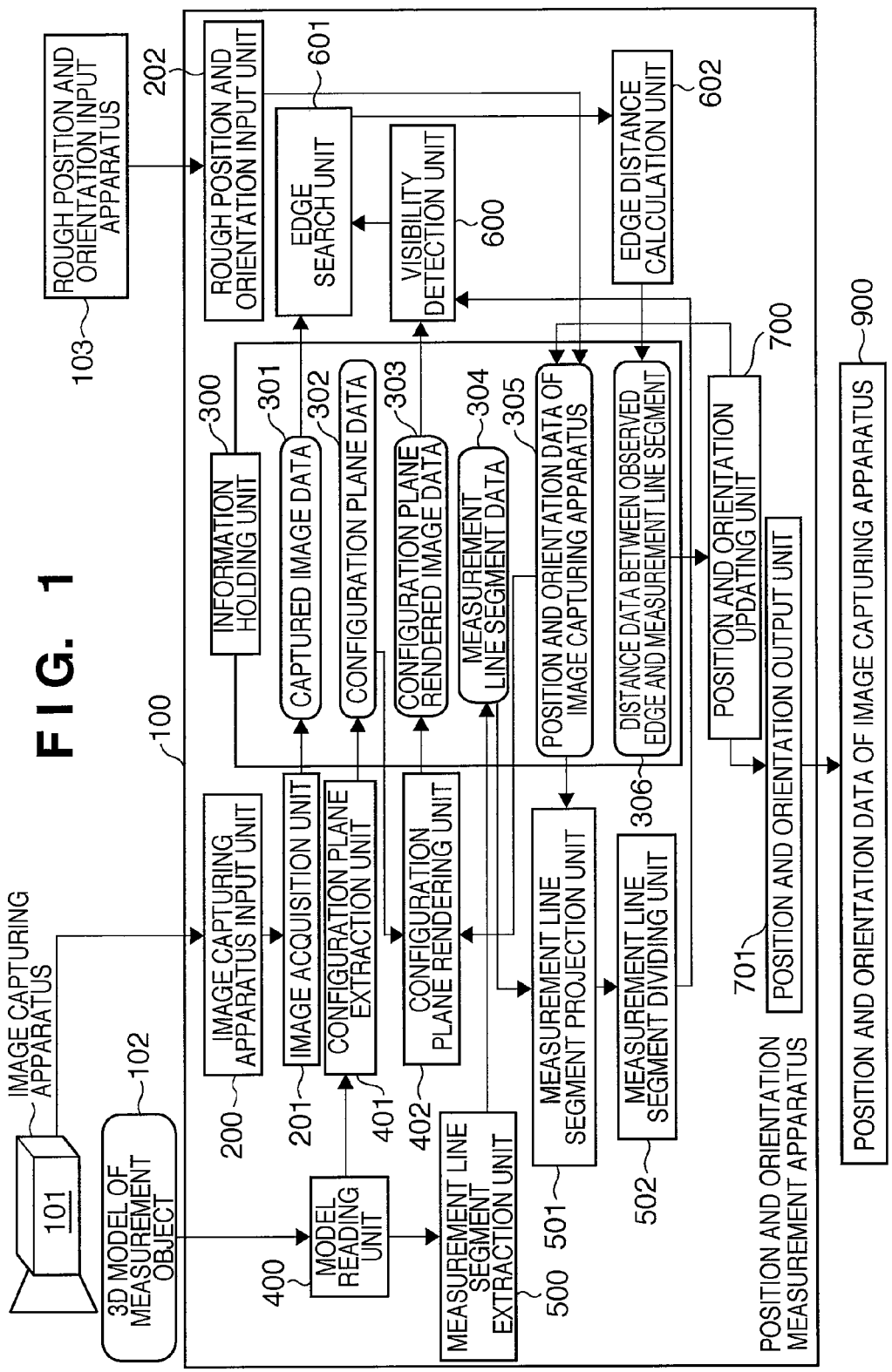
FIG. 1 is a block diagram showing the functional arrangement of a position and orientation measurement apparatus according to an embodiment.

FIG. 1 is a block diagram showing the arrangement when a position and orientation measurement apparatus 100 according to an embodiment of the present invention is applied to an image capturing apparatus 101. Note that the position and orientation measurement apparatus 100 comprises processors for executing respective processes, and a holding unit for holding information. The position and orientation measurement apparatus 100 may be a dedicated apparatus, or it can be implemented when an application program used to execute control of position and orientation measurement to be described later is executed in a general-purpose computer. In this case, an information holding unit 300 shown in FIG. 1 comprises a hard disk, RAM, or the like, and other units are implemented when the computer executes the application program. Such configuration is apparent to those who are skilled in the art. The position and orientation measurement apparatus 100 has as its object to measure the position and orientation of the image capturing apparatus 101 relative to a measurement object when the image capturing apparatus 101 captures the measurement object described in 3D model data 102 (to be referred to as a 3D model 102 hereinafter).

Assume that the measurement object is given on a world coordinate system. Furthermore, if a relative position and orientation of the measurement object on the world coordinate system are given, the 3D model of the measurement object can be handled as the world coordinate system if it is multiplied by a given relative position and orientation.

As the image capturing apparatus 101, a two-dimensional image capturing apparatus (so-called digital camera) using a photoelectric conversion element comprising a CCD or CMOS can be used. A video signal of the image capturing apparatus 101 is input to the position and orientation measurement apparatus 100 via an image capturing apparatus input unit 200.

The information holding unit 300 has a function of holding input and output states required in respective processors of the position and orientation measurement apparatus 100. The information holding unit 300 comprises a RAM (Random Access Memory).

An image acquisition unit 201 reconstructs a two-dimensional (2D) image based on a video signal input from the image capturing apparatus input unit 200 with reference to horizontal and vertical sync signals, and writes the 2D image in the information holding unit 300 as captured image data 301.

The 3D model 102 of the measurement object may be either data saved in advance in an external storage medium or data acquired from a remote server via a network. That is, the format and acquisition method of the 3D model 102 are not particularly limited as long as the 3D model data has a format that the position and orientation measurement apparatus 100 of this embodiment can handle. The 3D model 102 has 3D geometric information of the measurement object, and can use data created by 3D CAD or the like. If no design is available in advance, values actually measured by a measuring instrument may be input to create the 3D model. Upon editing the 3D model, commercially available CAD applications and modelers for CG productions may be used.

A model reading unit 400 reads out, from the 3D model 102, vertex coordinates of the model, line segment information that couples points, plane information configured by a plurality of line segments, and information of an appearance of a plane and the like. Furthermore, the model reading unit 400 passes these pieces of readout information to a configuration plane extraction unit 401 and measurement line segment extraction unit 500. The configuration plane extraction unit 401 extracts information that configures planes of the measurement object from the 3D model 102, and writes the extracted information in the information holding unit 300 as configuration plane data 302. The measurement line segment extraction unit 500 extracts a data set of measurement line segments (to be referred to as measurement line segment data hereinafter) used in registration from the 3D model 102 of the measurement object. Note that the measurement line segment extraction unit 500 extracts line segments suited to detection of edges on a captured image from those which form the configuration planes of the 3D model 102 as measurement line segment data, as will be described later with reference to FIGS. 4A and 4B. The extracted measurement line segment data are held as measurement line segment data 304 in the information holding unit 300. Assume that each measurement line segment is configured by two vertex coordinate positions and their coupling information. As described above, from the 3D model 102 read out by the model reading unit 400, the configuration plane data 302 and measurement line segment data 304 are held in the information holding unit 300. Note that the processing until the configuration plane data 302 and measurement line segment data 304 are held in the information holding unit 300 is executed when a new 3D model 102 of a measurement object is set in the position and orientation measurement apparatus 100 or its contents are updated.

A rough position and orientation input apparatus 103 can use an apparatus which can give a rough position and orientation effective for the position and orientation measurement apparatus 100 to execute estimation of position and orientation. For example, the rough position and orientation input apparatus 103 can use outputs from a 3D position measurement apparatus using a magnetic sensor or those from a 3D position and orientation apparatus using an ultrasonic sensor. In this case, a rough position and orientation that can be used as initial values required to precisely calculate the position and orientation from an image need only be estimated. The position and orientation detected by the rough position and orientation input apparatus 103 are held in the information holding unit 300 as position and orientation data 305 of the image capturing apparatus via a rough position and orientation input unit 202.

The processing for estimating the position and orientation of the image capturing apparatus by the position and orientation measurement apparatus 100 will be described below.

As a position and orientation estimation timing, for example, the processing is executed every time an image captured by the image capturing apparatus 101 is updated.

A configuration plane rendering unit 402 clears the configuration plane data 302. Then, the configuration plane rendering unit 402 renders the configuration plane data 302 extracted from the 3D model 102 of the measurement object as a 3D CG model observed from the image capturing apparatus 101 using the position and orientation data 305 that represent the roughly estimated position and orientation of the image capturing apparatus. As for depth information with respect to each configuration plane upon using the position and orientation of the image capturing apparatus 101 as a viewpoint a front depth position in the line of sight direction is held in the information holding unit 300 as configuration plane rendered image data 303.

More specifically, the configuration plane rendering unit 402 executes model view transformation of respective vertices of each configuration plane upon using the position and orientation of the image capturing apparatus 101 as a viewpoint. Then, the configuration plane rendering unit 402 compares each point obtained upon rasterizing that configuration plane with the value of the configuration plane rendered image data 303. When that point is determined as a value at a front position in the line of sight direction, the configuration plane rendering unit 402 updates the information.

A measurement line segment projection unit 501 executes model view transformation of respective vertices of the measurement line segment data 304 using, as a viewpoint, the position and orientation represented by the position and orientation data 305 of the image capturing apparatus held in the information holding unit 300. The measurement line segments that have undergone the model view transformation are divided by a measurement line segment dividing unit 502 in consideration of a length on a projected frame. An edge search unit 601 conducts a search in association with points which are not hidden by other configuration planes of dividing points obtained by this dividing processing. This processing can reduce the processing time compared to a search based on all points included in the measurement line segments on a captured image. That is, according to this embodiment, representative points (dividing points) are selected from projected line segments of the measurement line segments, and distances between edge positions searched from these representative points and the projected line segments are used, thus improving the processing efficiency. In the following description, the dividing points will also be referred to as representative points. Note that the number of dividing points may be set to be zero since each projected line segment cannot be observed even on a captured image if the length of that projected line segment on the projected frame is smaller than a given division minimum length. Furthermore, if the length of each projected line segment on the projected frame is larger than the given division minimum length, a plurality of dividing points are used.

A visibility detection unit 600 detects using depth information of the configuration plane rendered image data 303 if the representative points on the measurement line segments selected by the measurement line segment dividing unit 502 are hidden by other configuration planes. The visibility detection unit 600 passes information of the representative points which are determined not to be hidden (to be referred to as visible-determined representative points hereinafter) to the edge search unit 601 as edge search points which can be observed on a captured image represented by the captured image data 301. In this way, since the observable edge search points and corresponding edges are used in registration estimation, error factors of estimation can be eliminated.

The edge search unit 601 scans the densities of pixels of the captured image represented by the captured image data 301 from a position on the image of each edge search point in direction orthogonal to the corresponding measurement line segment. It is preferable to set the scan range in consideration of the positional relationship between the positions and orientations of the measurement object and image capturing apparatus 101. The unit 601 extracts the position of a point where the scanned density has a larger density gradient than an adjacent pixel as an observed edge. The edge search unit 601 may extract a plurality of observed edges.

An edge distance calculation unit 602 calculates distances between the coordinate positions of the observed edges of the captured image represented by the captured image data 301 and the measurement line segments projected onto the captured image. Furthermore, the edge distance calculation unit 602 stores the calculated distance information in the information holding unit 300 as distance data 306 between the observed edges and the projected measurement line segments.

A position and orientation updating unit 700 updates the estimated position and orientation of the image capturing apparatus 101 using the distance data 306 held in the information holding unit 300. Furthermore, a position and orientation output unit 701 outputs the updated result to outside the position and orientation measurement apparatus 100 as position and orientation data 900 of the image capturing apparatus 101.

The updating procedures of the position and orientation of the image capturing apparatus 101 by the position and orientation updating unit 700 will be described below.

Assume that the positions of the measurement line segments of the measurement object are defined on a certain reference coordinate system. Coordinates $[x_w\ y_w\ z_w]^T$ of a point on the reference coordinate system and coordinates $[u_x\ u_y]^T$ of that point on the captured image have the following relationship based on a perspective projection transformation matrix P:

$$\begin{pmatrix} hu_x \\ hu_y \\ h \end{pmatrix} = P \begin{pmatrix} x_w \\ y_w \\ z_w \\ 1 \end{pmatrix} \quad (1)$$

where h is an expression of homogenous coordinate transformation, and the coordinates $[u_x\ u_y]^T$ are calculated using the calculated h. Assuming that a matrix R (3×3 matrix) having $R_{11}, R_{12}, R_{13}, R_{21}, R_{22}, R_{23}, R_{31}, R_{32}$, and $R_{33}$ as elements is a rotation matrix of the orientation on the reference coordinate system, and $t=[t_x\ t_y\ t_z]$ is a translation vector, P in the above equation can be expressed by:

$$P = \begin{pmatrix} -f_x & 0 & p_x & 0 \\ 0 & -f_y & p_y & 0 \\ 0 & 0 & 1 & 0 \end{pmatrix} \begin{pmatrix} & & & \\ & R & & t \\ & & & \\ 0 & 0 & 0 & 1 \end{pmatrix} \quad (2)$$

$$= \begin{pmatrix} -f_x & 0 & p_x & 0 \\ 0 & -f_y & p_y & 0 \\ 0 & 0 & 1 & 0 \end{pmatrix} \begin{pmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{pmatrix}$$

where $f_x$ and $f_y$ are the focal lengths in the horizontal and vertical directions, and $p_x$ and $p_y$ are principal point coordinates in the horizontal and vertical directions on the captured image frame.

Whether or not errors of the position and orientation to be estimated of the image capturing apparatus are small can be determined by executing optimization calculations to reduce the difference between the projected position of a model which is to be observed from the estimated position and orientation, and the actual observed position on the captured image frame.

In this case, an error function E which represents a difference between the observed position and projected position is used. Assume that E is a function which has, as inputs, a position $t=[t_x\ t_y\ t_z]^T$ and orientation $\omega=[\omega_x\ \omega_y\ \omega_z]^T$ of the camera, and a position $x_w=[x_w\ y_w\ z_w]^T$ of an observation point on the reference coordinate system. Letting $u'=[u'_x\ u'_y\ u'_z]^T$ be the projected position, and $u=[u_x\ u_y]^T$ be the observed position, an error on the captured image can be expressed by the difference between these positions:

$$E(t_x,t_y,t_z,\omega_x,\omega_y,\omega_z,x_w,y_w,z_w)=u'-u \quad (3)$$

In general, since the relationship between the position and orientation, and the position of the observation point is nonlinear, E given by equation (3) above is also a nonlinear function with respect to inputs.

In this embodiment, an error on the frame from the observed position $u=[u_x\ u_y]^T$ becomes a line segment obtained by projecting the corresponding measurement line segment onto the captured image. Hence, letting $u''=[u''_x\ u''_y]^T$ be a point where a straight line perpendicular to the projected measurement line segment and passes through the observed position $u=[u_x\ u_y]^T$ intersects with the projected measurement line segment, $$E'(t_x,t_y,t_z,\omega_x,\omega_y,\omega_z,x_w,y_w,z_w)=u''-u \quad (4)$$

is used as an error function.

Within a range in which the position and orientation of the image capturing apparatus change slightly, linear approximation of equation (4) using Taylor expansion of first order can be expressed by:

$$E'(t_x, t_y, t_z, \omega_x, \omega_y, \omega_z, x_w, y_w, z_w) \cong \quad (5)$$
$$E'_0 + \frac{\partial E'}{\partial t_x}\Delta t_x + \frac{\partial E'}{\partial t_y}\Delta t_y + \frac{\partial E'}{\partial t_z}\Delta t_z + \frac{\partial E'}{\partial \omega_x}\Delta\omega_x +$$
$$\frac{\partial E'}{\partial \omega_y}\Delta\omega_y + \frac{\partial E'}{\partial \omega_z}\Delta\omega_z + \frac{\partial E'}{\partial x_w}\Delta x_w + \frac{\partial E'}{\partial y_w}\Delta y_w + \frac{\partial E'}{\partial z_w}\Delta z_w$$

where $E'_0$ is the difference between the projected position and observed position, i.e., an error upon substitution of the position $t^0=[t_x^0\ t_y^0\ t_z^0]^T$ and orientation $\omega^0=[\omega_x^0\ \omega_y^0\ \omega_z^0]^T$ of the camera, target point coordinates $x_w^0=[x_w^0\ y_w^0\ z_w^0]^T$, and observed position $u^0=[u_x^0\ u_y^0]^T$.

In this way, $\Delta t_x, \Delta t_y, \Delta t_z, \Delta\omega_x, \Delta\omega_y, \Delta\omega_z, \Delta x_w, \Delta y_w$, and $\Delta z_w$, are calculated using the linear equation near $t^0, \omega^0$, and $x^0$, and a correction value is added to $t^0, \omega^0$, and $x^0$, thereby reducing the error.

Normally, since the number of equations does not match that of variables, a correction vector $\Delta$ is calculated by a least square method using information of many reference points.

A correction vector $\Delta$ will be summarized below. Let J be a matrix which combines partial differentials of variables. Then, a correction vector $\Delta$ and error vector E' can be written, using the above equation, as:

$$J\Delta = E' \quad (6)$$

When the right- and left-handed terms are multiplied by a transposed matrix $J^T$ of J, and the resultant equation is arranged as an equation of the correction vector $\Delta$, we have:

$$\Delta = (J^TJ)^{-1}J^TE' \quad (7)$$

By repeating the updating processing until the value of the correction vector $\Delta$ becomes small, a position and orientation with high precision can be calculated.

The aforementioned method indicates a solving method using the Newton method, but the optimization calculations may be made by other methods. In this embodiment, since the differences between the observed line segments and the line segments of the model projected according to the estimated position and orientation need only be reduced, the effect of the present invention can be obtained by applying a known nonlinear optimization method. For example, a method of generating many random combinations of positions and orientations having slight differences around variable values of the roughly estimating position and orientation, calculating an error is calculated for each combination, and using a combination with the small error value may be used to obtain the same effect.

An example in which the position and orientation measurement apparatus 100 of this embodiment is applied to mixed reality will be described below.

Figure 2:
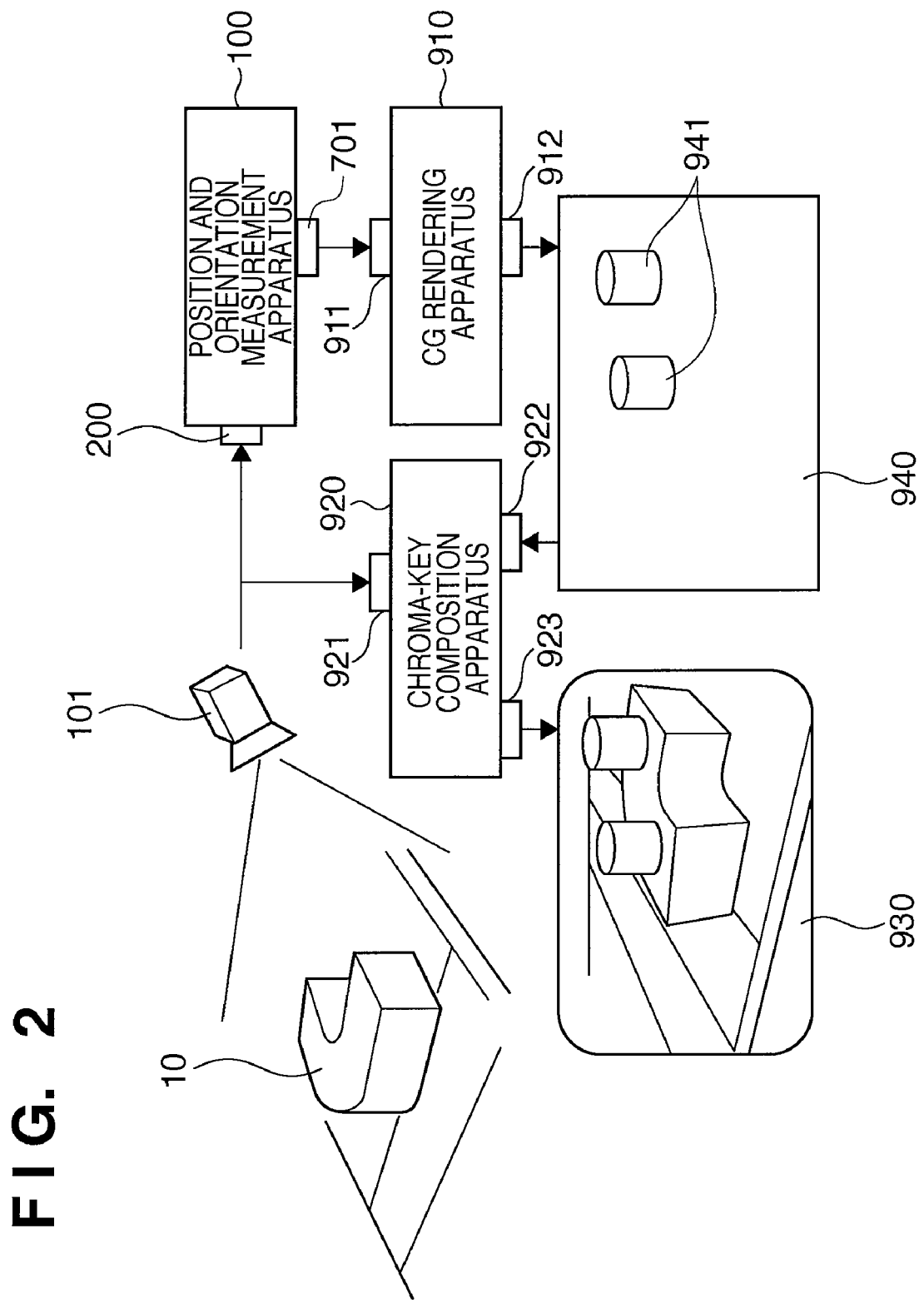
FIG. 2 is a diagram for explaining the arrangement for rendering a virtual object CG in correspondence with the position and orientation of an image capturing apparatus, which is measured by the position and orientation measurement apparatus according to the embodiment, using a mixed reality technique.

FIG. 2 is a diagram when the mixed reality technique that superimposes a virtual object CG onto a measurement object is implemented using the position and orientation measurement apparatus 100 of this embodiment.

Assume that a measurement object 10 is a 3D object whose shape is given. The configuration planes of the measurement object 10 having curved surfaces are configured by a plurality of planes. The observation angle of the measurement object is not particularly specified.

An image captured by the image capturing apparatus 101 is input by the image capturing apparatus input unit 200 of the position and orientation measurement apparatus 100. The image capturing apparatus 101 is also connected to an image input unit 921 of a chroma-key composition apparatus 920.

Assume that the 3D model 102 of the measurement object 10 has already been registered in the position and orientation measurement apparatus 100.

When a captured image includes the measurement object 10, the position and orientation measurement apparatus 100 outputs the position and orientation measurement result of the image capturing apparatus 101 by the aforementioned processing via the position and orientation output unit 701.

A CG rendering apparatus 910 inputs the position and orientation of the image capturing apparatus 101 via a position and orientation input unit 911, and renders CG data of a virtual objects to have the input position and orientation as a viewpoint position of the CG data. The CG rendering apparatus 910 outputs an image of the rendered CG data of the virtual objects via a CG image output unit 912.

In the example shown in FIG. 2, the CG rendering apparatus 910 renders two cylinders 941 as virtual objects on the measurement object 10, and outputs a virtual object CG image 940 via the CG image output unit 912. Assume that the background color of the image 940 is a chroma-key corresponding color.

The chroma-key composition apparatus 920 fetches the virtual object CG image 940 from a chroma-key target image input unit 922 onto the captured image of the image capturing apparatus 101 input from the image input unit 921. The chroma-key composition apparatus 920 composites the virtual object CG image 940 onto the captured image while transparentizing the region having the chroma-key corresponding color, and outputs an obtained composite image 930 via a chroma-key composite image output unit 923. The output composite image 930 includes the captured measurement object and the two cylinders as virtual object CG data rendered on the object.

For example, this embodiment allows the user to observe an actual part and virtual parts designed by CAD on the screen, and to check interference between parts and the like. When the composite image 930 is observed using an HMD (Head Mount Display), operator's confirmation is facilitated, which is preferable. In this case, when the direction of the image capturing apparatus 101 is set to agree with the line of sight direction, the position and orientation of the head can match the physical space that the operator is observing, thus improving the operability using mixed reality. Furthermore, the position and orientation measurement apparatus 100, CG rendering apparatus 910, and chroma-key composition apparatus 920 can be implemented by programs on a single computer.

Figure 3C:
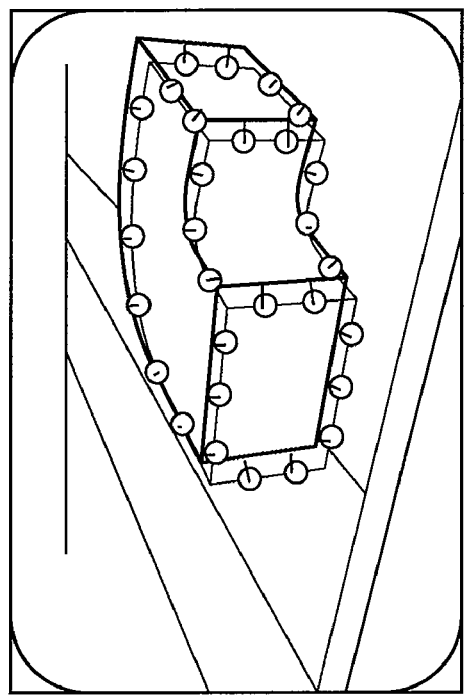
FIGS. 3A to 3C are views for explaining a captured image, and a state in which representative points of measurement line segments and edges of the captured image are searched in the position and orientation measurement apparatus according to the embodiment.
Figure 3A:
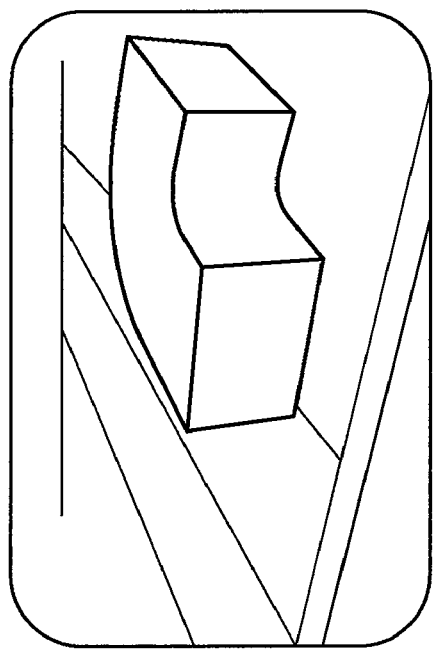
Figure 3B:
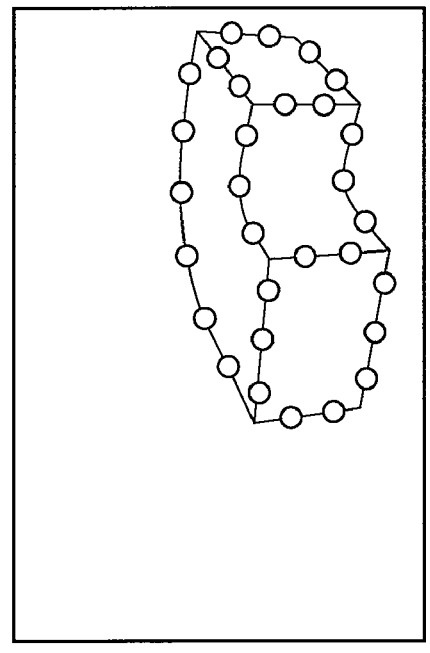

FIGS. 3A to 3C show the relationship between the captured image and the measurement line segments of the measurement object. FIG. 3A shows an image (captured image) captured by the image capturing apparatus 101. Line segments in FIG. 3B are those (measurement line segments) projected onto the captured image by the measurement line segment extraction unit 500 and measurement line segment projection unit 501 of the position and orientation measurement apparatus 100. Furthermore, blank dots in FIG. 3B are edge search points (representative points), which are determined to be visible by the visibility detection unit 600, of dividing points obtained by dividing the projected measurement line segments by the measurement line segment dividing unit 502.

FIG. 3C shows a state in which edges of the measurement object on the captured image in FIG. 3A are searched for from the edge search points in FIG. 3B in directions perpendicular to the projected measurement line segments. Short line segments extending from the positions of the edge search points indicated by the blank dots are distances to the observed edges of the measurement object 10 in the captured image shown in FIG. 3A. That is, FIG. 3C shows an example in which the edges of the captured image are searched for from the representative points of the measurement line segments (in the direction orthogonal to the measurement line segments). The precision of the estimated position and orientation of the image capturing apparatus 101 can be higher with decreasing distances between the line segments and edges in FIG. 3C.

The model reading unit 400, configuration plane extraction unit 401, and measurement line segment extraction unit 500 according to this embodiment will be described in more detail below.

Figure 4A:
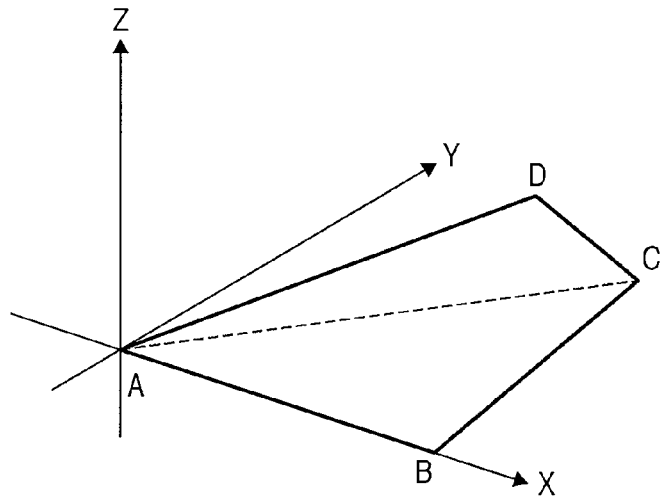
FIG. 4A shows a 3D model to be measured used in the position and orientation measurement apparatus according to the embodiment.
Figure 4B:
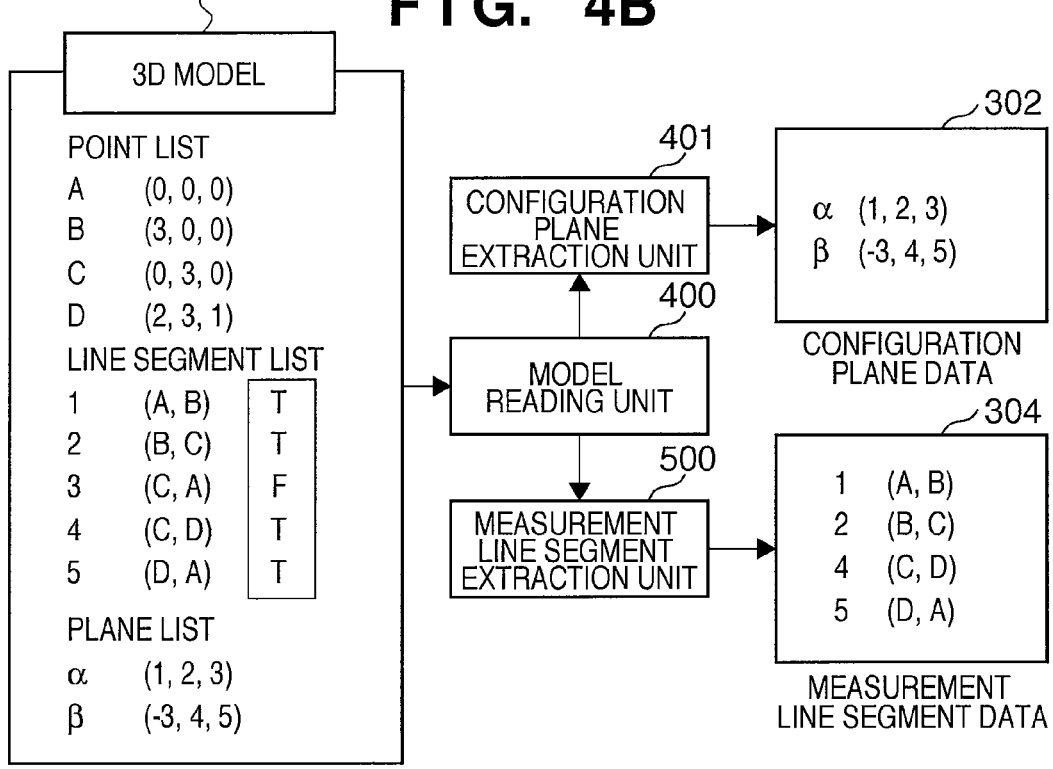
FIG. 4B is a view for explaining extracted data read out by a model reading unit from the 3D model shown in FIG. 4A.

A case will be explained wherein there is one rectangle ABCD as a 3D model of a measurement object, as shown in FIG. 4A. FIG. 4B is a view for explaining the 3D model of the rectangle ABCD in FIG. 4A, and processing for extracting configuration planes and measurement line segments from that 3D model.

The 3D model 102 of the measurement object is configured by a point list including the coordinates of vertices, a line segment list connecting points, and a plane list configuring planes. In general, most of CAD and CG data are similar to such a model description.

In this embodiment, attributes used to allow the measurement line segment extraction unit 500 to designate whether or not a line segment of interest is a measurement line segment are added as those of the line segment list of the 3D model 102.

The configuration plane extraction unit 401 extracts planes used in rendering of the configuration planes of the measurement object from the 3D model 102. In this case, two triangles, that is, a triangle ABC and triangle ACD indicated by $\alpha(1, 2, 3)$ and $\beta(-3, 4, 5)$ are extracted as extracted configuration plane data 302. Numeric values in the plane list mean numbers in the line segment list, and symbols in parentheses in the line segment list indicate the coordinates in the point list. Also, a numerical value with a "−" sign in the plane list indicates that the start and end points of a line segment registered in the line segment list are reversed. The configuration plane data 302 are used by the configuration plane rendering unit 402.

Processing for extracting measurement line segment data 304 by the measurement line segment extraction unit 500 will be described below. The measurement line segment extraction unit 500 extracts data from the line segment list of the 3D model 102. Assume that a line segment (A, C) is an edge which is hard to observe on the captured image due to a surface treatment and color of the measurement object. For this reason, this line segment is not used as a measurement line segment for registration. Hence, an attribute whether or not a line segment of interest is a measurement line segment is appended to the line segment list. In the example of FIG. 4B, when each line segment in the line segment list is used as a measurement line segment, an attribute value "T" is appended to that line segment; otherwise, an attribute value "F" is appended.

The measurement line segment extraction unit 500 extracts line segments with the attribute value "T" from the line segment list to write them out as measurement line segment data 304.

In the example of FIG. 4B, a line segment (C, A) in the line segment list is set with the attribute value "F". The measurement line segment extraction unit 500 extracts line segments other than that appended with the attribute value "F" in the line segment list, i.e., four line segments (A, B), (B, C), (C, D), and (D, A) set with the attribute value "T".

When a CAD or CG modeler that cannot register any attribute values is used, designation of an attribute value that allows discriminating a measurement line segment may be described in a field used to designate a line segment color. For example, the least significant bit upon expressing the numerical value of a color attribute value using bits is "0" or "1", and a measurement line segment="1" and otherwise="0". In any case, the extraction method of attributes need only correspond to the attributes of the measurement line segment extraction unit 500 and 3D model 102.

Note that the method of adding and assigning attributes to the line segment list of the 3D model 102 of the measurement object has been described. However, the configuration of the present invention is not limited to the aforementioned method as long as only a mechanism for extracting configuration plane data and measurement line segment data from the 3D model 102 of the measurement object need be provided. For example, measurement line segments used in detection of the edges of the captured image may be extracted from line segments which form the configuration planes of 3D model data based on the characteristics of adjacent configuration planes.

More specifically, measurement line segments can be extracted using geometric features of a 3D model, and this method will be described below. Assume that a plurality of planes are set in a 3D model of a measurement object. An angle between two planes can be determined by calculating the angle between their normal vectors. When the angle of a given plane with an adjacent plane is larger than a given value, that plane tends to be observed as an edge due to a difference of the amount of reflected light based on illumination. Hence, the measurement line segment extraction unit 500 extracts this condition. That is, the angle with an adjacent plane is calculated, and when the angle normals make is larger than a prescribed value, an adjacent edge is extracted as a measurement line segment. In this manner, information that can be used as a data set of measurement line segments corresponding to the edges of the measurement object on the captured image can be extracted.

When the colors of the configuration planes of a 3D model correspond to those of planes which configure the measurement object on the physical space, measurement line segments can be extracted using that information. In this case, the measurement line segment extraction unit 500 extracts a line segment of a part of an adjacent plane which has a hue and density different from those of a given plane as a measurement line segment. For example, when a logo of a company name or product name is largely described on the measurement object, the color of a plane of each character that configures the logo, and that of a plane outside the character need only be designated. Based on the difference between these colors, a density gradient near a line segment corresponding to an outline part of the logo on the captured image is large, and such part tends to be observed as an observed edge. In this manner, measurement line segment data 304 corresponding to the observed edge of the actual captured image can be extracted.

Figure 5:
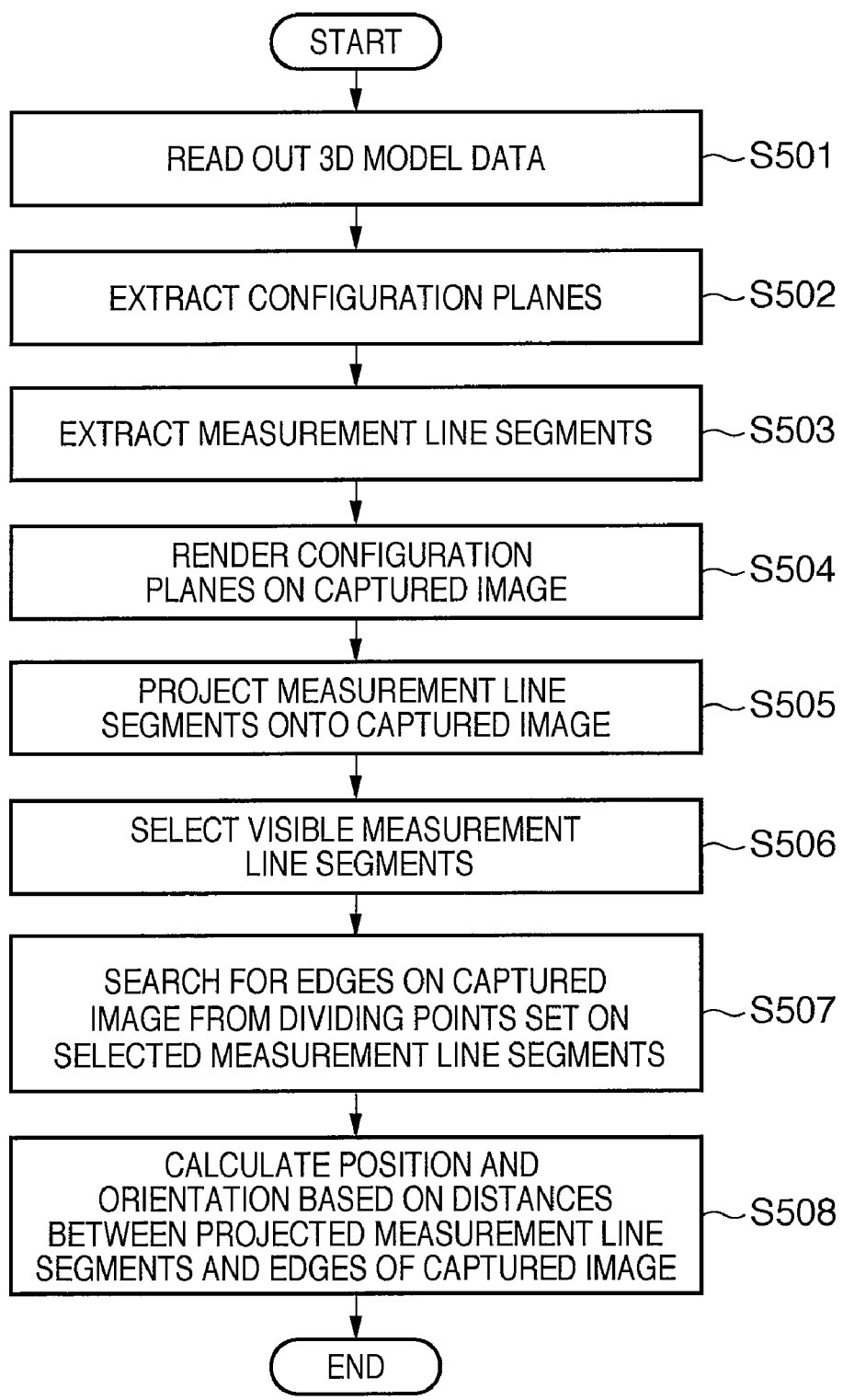
FIG. 5 is a flowchart showing the processing of the position and orientation measurement apparatus according to the embodiment.

The processing sequence of the position and orientation measurement apparatus 100 of this embodiment will be further described with reference to the flowchart of FIG. 5.

In step S501, the model reading unit 400 reads out the 3D model 102 from, for example, a hard disk (not shown). In step S502, the configuration plane extraction unit 401 extracts the configuration plane data 302 from the 3D model 102 read out in step S501, and stores the extracted data in the information holding unit 300 which comprises, for example, a RAM. In step S503, the measurement line segment extraction unit 500 extracts measurement line segments from the 3D model 102 read out in step S501, and registers them as the measurement line segment data 304.

More specifically, the measurement line segment extraction unit 500 extracts measurement line segments to be used in detection of edges in the captured image from line segments which configure the configuration planes of the 3D model 102. As described above using FIG. 4B, the extraction methods of measurement line segments include:

the method of assigning attributes indicating use/non-use as a measurement line segment to respective line segments of the 3D model 102, and making the measurement line segment extraction unit 500 extract measurement line segments according to these attributes;

the method of making, when the difference between the normal directions of adjacent configuration planes exceeds a threshold, the measurement line segment extraction unit 500 extract a line segment sandwiched between these adjacent configuration planes as a measurement line segment from line segments registered in the 3D model 102;

the method of making, when the difference between the colors of adjacent configuration planes exceeds a threshold, the measurement line segment extraction unit 500 extract a line segment sandwiched between these adjacent configuration planes as a measurement line segment from line segments registered in the 3D model 102; and the like.

In step S504, the configuration plane rendering unit 402 renders the configuration planes on the captured image based on the configuration plane data 302 acquired in step S502. In step S505, the measurement line segment projection unit 501 projects the measurement line segment data 304 acquired in step S503 onto the captured image.

In step S506, the visibility detection unit 600 detects and selects measurement line segments which are not hidden by the configuration planes. For example, the visibility detection unit 600 detects and selects measurement line segments located at the viewpoint side compared to depth information of the configuration planes as visible measurement line segments, on the basis of the position and orientation represented by the position and orientation data 305. In step S507, the edge distance calculation unit 602 calculates the edge distances, on the captured image, of the measurement line segments detected in step S506. As described above, in this embodiment, edges are searched for from the dividing points (representation points) obtained by the measurement line segment dividing unit 502, and the distances between the measurement line segments and edges are calculated. The calculated distances are held in the information holding unit 300 as the distance data 306. In step S508, the position and orientation updating unit 700 calculates a relative position and orientation between the image capturing apparatus 101 and measurement object based on the distance data 306, and updates the position and orientation by the calculation result.

Other Embodiments

The embodiment and its modification have been described. However, the present invention comprises only a camera and an apparatus which implements processing means of the present invention. Therefore, for example, when the processing arrangement of the present invention is implemented in the form of a program to be executed by a portable phone or portable computer, the same effects can be obtained. Furthermore, a secondary service which presents information of nearby facilities and places using the position and orientation measurement result may be provided.

That is, the present invention can be practiced in the forms of a system, apparatus, method, program, storage medium, and the like. More specifically, the present invention can be applied to either a system constituted by a plurality of devices, or an apparatus consisting of a single equipment.

Note that the present invention includes a case in which the functions of the aforementioned embodiments are achieved by directly or remotely supplying a program of software to a system or apparatus, and reading out and executing the supplied program code by a computer of that system or apparatus. In this case, the supplied program is a program corresponding to the illustrated flowchart in the embodiment.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

A computer-readable storage medium for supplying the program includes: for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, connection can be established to a home page on the Internet using a browser on a client computer, and the computer program of the present invention can be downloaded from the home page to a recording medium such as a hard disk or the like. In this case, the program to be downloaded may be a compressed file including an automatic installation function. Also, the program code that forms the program of the present invention may be segmented into a plurality of files, which may be downloaded from different home pages. That is, the present invention includes a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the program from a home page via the Internet, and may install the program in the computer by executing the encrypted program using that key information.

The functions of the aforementioned embodiments may be implemented not only by executing the readout program code by the computer but also in cooperation with an OS or the like running on the computer based on an instruction of that program. In this case, the OS or the like executes some or all of actual processes, which implement the functions of the aforementioned embodiments.

Furthermore, some or all of the functions of the aforementioned embodiments may be implemented by writing the program read out from the recording medium in a memory equipped in a function expansion board or a function expansion unit, which is inserted into or connected to the computer. In this case, after the program is written in the function expansion board or unit, a CPU or the like equipped on that function expansion board or unit executes some or all of actual processes based on an instruction of that program.

According to the present invention, even when the 3D model of the measurement object has been geometrically changed, the consistency of the data set can be maintained.

The procedures required to estimate the position and orientation of the measurement object having a complicated shape can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-134583, filed May 21, 2007, which is hereby incorporated by reference herein in its entirety.

What is claimed is:

1. A position and orientation measurement apparatus for measuring a position and orientation of an image capturing apparatus, which captures an image of a measurement object, relative to the measurement object, said apparatus comprising:

a configuration plane extraction unit configured to extract configuration planes of the measurement object based on held three-dimensional model data of the measurement object;

a line segment extraction unit configured to extract measurement line segments used in detection of edges of a captured image from line segments which form the configuration planes of the three-dimensional model data, based on characteristics of adjacent configuration planes;

a line segment projection unit configured to project the measurement line segments extracted by said line segment extraction unit onto the captured image, based on an estimated position and orientation of the image capturing apparatus;

a selection unit configured to select visible measurement line segments which are visible at the estimated position and orientation from the measurement line segments projected onto the captured image, based on the configuration planes extracted by said configuration plane extraction unit; and a calculation unit configured to calculate a position and orientation of the image capturing apparatus relative to the measurement object based on the measurement line segments selected by said selection unit and corresponding edges of the captured image.

2. The apparatus according to claim 1, wherein said selection unit holds depth information of the configuration planes observed from the estimated position and orientation by rendering the configuration planes of the measurement object with the estimated position and orientation as a viewpoint, and said selection unit selects measurement line segments which are located on a viewpoint side compared to the depth information of the projected measurement line segment information as the visible measurement line segments.

3. The apparatus according to claim 1, wherein said calculation unit comprises:

a dividing unit configured to divide the projected measurement line segments by setting dividing points on the measurement line segments projected onto the captured image;

an edge search unit configured to search pixels on the captured image from the dividing points to detect positions where a change in density gradient exceeds a threshold as edge positions;

an edge distance calculation unit configured to calculate distances between the edge positions detected by said edge search unit and the measurement line segments set with the dividing points; and a position and orientation updating unit configured to update the position and orientation of the image capturing apparatus to reduce the distances calculated by said edge distance calculation unit.

4. The apparatus according to claim 1, wherein when a difference between normal directions of adjacent configuration planes exceeds a threshold, said line segment extraction unit extracts a line segment sandwiched between the adjacent configuration planes as a measurement line segment from line segments registered in the three-dimensional model data.

5. The apparatus according to claim 1, wherein when a difference between colors of adjacent configuration planes exceeds a threshold, said line segment extraction unit extracts a line segment sandwiched between the adjacent configuration planes as a measurement line segment from line segments registered in the three-dimensional model data.

6. A position and orientation measurement apparatus for measuring a position and orientation of an image capturing apparatus, which captures an image of a measurement object, relative to the measurement object, said apparatus comprising:

a holding unit configured to hold three-dimensional model data of the measurement object, the three-dimensional model data being assigned for each line segment with an attribute, which indicates whether or not that line segment is used in detection of edges of a captured image;

a configuration plane extraction unit configured to extract configuration planes of the measurement object based on the three-dimensional model data;

a line segment extraction unit configured to extract line segments assigned with the attribute indicating the line segments used in detection of edges of the captured image as measurement line segments from the three-dimensional model data;

a line segment projection unit configured to project the measurement line segments extracted by said line segment extraction unit onto the captured image, based on an estimated position and orientation of the image capturing apparatus;

a selection unit configured to select visible measurement line segments which are visible at the estimated position and orientation from the measurement line segments projected onto the captured image, based on the configuration planes extracted by said configuration plane extraction unit; and a calculation unit configured to calculate a position and orientation of the image capturing apparatus relative to the measurement object based on the measurement line segments selected by said selection unit and corresponding edges of the captured image.

7. A method of controlling a position and orientation measurement apparatus for measuring a position and orientation of an image capturing apparatus, which captures an image of a measurement object, relative to the measurement object, said method comprising:

a configuration plane extraction step of extracting configuration planes of the measurement object based on held three-dimensional model data of the measurement object;

a line segment extraction step of extracting measurement line segments used in detection of edges of a captured image from line segments which form the configuration planes of the three-dimensional model data, based on characteristics of adjacent configuration planes;

a line segment projection step of projecting the measurement line segments extracted in the line segment extraction step onto the captured image, based on an estimated position and orientation of the image capturing apparatus;

a selection step of selecting visible measurement line segments which are visible at the estimated position and orientation from the measurement line segments projected onto the captured image, based on the configuration planes extracted in the configuration plane extraction step; and a calculation step of calculating a position and orientation of the image capturing apparatus relative to the measurement object based on the measurement line segments selected in the selection step and corresponding edges of the captured image.

8. The method according to claim 7, wherein in the selection step, depth information of each of the configuration planes observed from the estimated position and orientation by rendering the configuration planes of the measurement object with the estimated position and orientation as a viewpoint is held, and measurement line segments which are located on a viewpoint side compared to the depth information of the projected measurement line segment information are selected as the visible measurement line segments.

9. The method according to claim 7, wherein the calculation step comprises:

a dividing step of dividing the projected measurement line segments by setting dividing points on the measurement line segments projected onto the captured image;

an edge search step of searching pixels on the captured image from the dividing points to detect positions where a change in density gradient exceeds a threshold as edge positions;

an edge distance calculation step of calculating distances between the edge positions detected in the edge search step and the measurement line segments set with the dividing points; and a position and orientation updating step of updating the position and orientation of the image capturing apparatus to reduce the distances calculated in the edge distance calculation step.

10. The method according to claim 7, wherein in the line segment extraction step, when a difference between normal directions of adjacent configuration planes exceeds a threshold, a line segment sandwiched between the adjacent configuration planes is extracted as a measurement line segment from line segments registered in the three-dimensional model data.

11. The method according to claim 7, wherein in the line segment extraction step, when a difference between colors of adjacent configuration planes exceeds a threshold, a line segment sandwiched between the adjacent configuration planes is extracted as a measurement line segment from line segments registered in the three-dimensional model data.

12. A method of controlling a position and orientation measurement apparatus for measuring a position and orientation of an image capturing apparatus, which captures an image of a measurement object, relative to the measurement object, said method comprising:

a holding step of holding three-dimensional model data of the measurement object, the three-dimensional model data being assigned for each line segment with an attribute, which indicates whether or not that line segment is used in detection of edges of a captured image;

a configuration plane extraction step of extracting configuration planes of the measurement object based on the three-dimensional model data;

a line segment extraction step of extracting line segments assigned with the attribute indicating the line segments used in detection of edges of the captured image as measurement line segments from the three-dimensional model data;

a line segment projection step of projecting the measurement line segments extracted in the line segment extraction step onto the captured image, based on an estimated position and orientation of the image capturing apparatus;

a selection step of selecting visible measurement line segments which are visible at the estimated position and orientation from the measurement line segments projected onto the captured image, based on the configuration planes extracted in the configuration plane extraction step; and a calculation step of calculating a position and orientation of the image capturing apparatus relative to the measurement object, based on the measurement line segments selected in the selection step and corresponding edges of the captured image.

13. A non-transitory computer-readable storage medium storing a program to make a computer execute a method of controlling a position and orientation measurement apparatus according to claim 7.

14. A non-transitory computer-readable storage medium storing a program to make a computer execute a method of controlling a position and orientation measurement apparatus according to claim 12.

* * * * *